(No Model.)
L. KROB.
ERASER CASE.
No. 298,096.   Patented May 6, 1884.
Fig. 1.   Fig. 2.   Fig. 3.
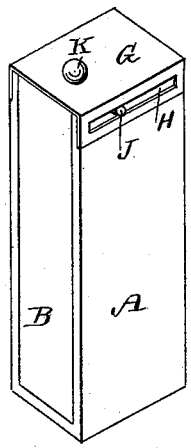 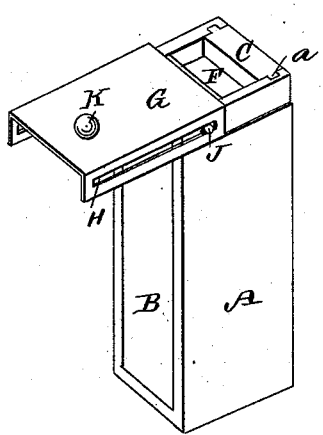 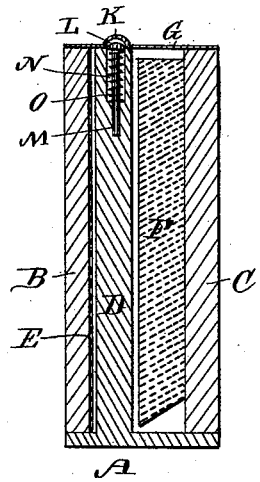
Fig. 4.
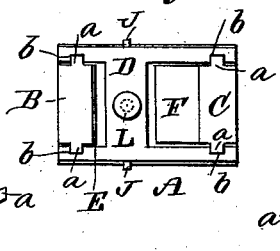
Fig. 5.   Fig. 6.
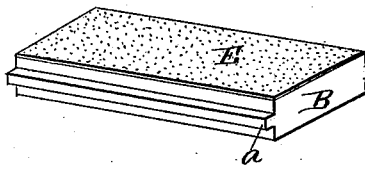 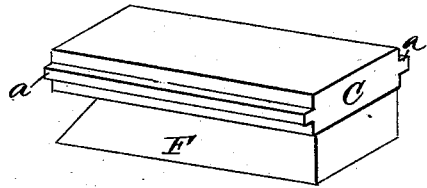
Fig. 7.
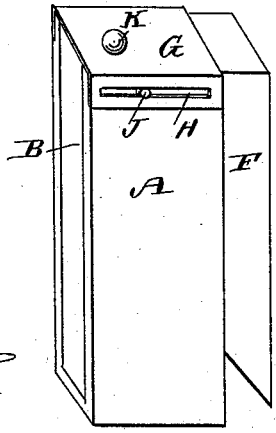
WITNESSES:
Theo. G. Hoster
C. Sedgwick
INVENTOR:
L. Krob
BY Munn & Co
ATTORNEYS.

UNITED STATES PATENT OFFICE.

LOUIS KROB, OF ZANESVILLE, OHIO.

ERASER-CASE.

SPECIFICATION forming part of Letters Patent No. 298,096, dated May 6, 1884.

Application filed June 30, 1883. (No model.)

*To all whom it may concern:*

Be it known that I, LOUIS KROB, of Zanesville, Muskingum county, Ohio, have invented a new and Improved Eraser-Case, of which the following is a full, clear, and exact description.

The object of my invention is to provide a new and improved case for a rubber eraser, which case also serves as a handle while using the rubber, and containing a device for cleaning the rubber when the same has become soiled.

The invention consists in a case provided with two slides, on one of which an eraser is fastened, and the other is provided with an abrading-surface for cleaning the eraser. If the eraser is to be used, its slide is withdrawn from the casing, is reversed, and passed back into the casing again, so that the casing serves as a handle for the eraser.

Reference is to be had to the accompanying drawings, forming part of this specification, in which similar letters of reference indicate corresponding parts in all the figures.

Figure 1 is a perspective view of my improved eraser-case, showing it closed. Fig. 2 is a similar view showing it opened to permit removing the eraser. Fig. 3 is a longitudinal sectional elevation of the same. Fig. 4 is an end view with the sliding cover removed. Fig. 5 is a perspective view of the slide for cleaning the eraser. Fig. 6 is a perspective view of the eraser and the slide to which it is fastened; and Fig. 7 is a perspective view of the casing, showing the eraser held on the same, ready for use.

A casing, A, is provided with two sliding sides, B and C, and a central partition, D, between them and parallel therewith, the said partition being very close to the slide B. On the longitudinal edges the slides are provided with tongues *a*, adapted to pass into corresponding grooves, *b*, in the inner surfaces of the fixed sides of the casing along the edges of the same. Sand-paper, emery-paper, or any other suitable abrading substance, E, is fastened on the inner surface of the slide B, and an erasing-rubber, F, is fastened in some suitable manner on the inner surface of the slide C. The casing A is provided on the open end with a sliding cover, G, having its side edges turned down on the fixed sides of the casing, the said edges being provided with longitudinal slots H, through which pins J pass, which project from the fixed sides of the casing. The sliding cover G is provided in its under side with a recess, K, into which the head L on a pintle, M, is adapted to pass, the said pintle being contained in a longitudinal aperture, O, in the end of the partition D, and is surrounded by a spiral spring, N, or other spring, which presses it outward or upward. The spring-pintle holds the cover G in place when the case is closed. If the eraser is to be used, the cover G is drawn or pushed to one side, as shown in Fig. 2, and thus the slide C is withdrawn, reversed, and passed into the casing again, the eraser being then on the outside. The cover G is then pushed back to hold the slide in place. The case thus serves as a handle, and the entire surface of the eraser can be used for cleaning the paper, &c. If the surface of the eraser becomes soiled, the slide B is withdrawn from the casing, and its abrading-surface is rubbed over the eraser and removes the soiled parts of the same. The casing keeps the eraser clean when not in use.

Having thus described my invention, I claim as new and desire to secure by Letters Patent—

1. An eraser-case having a sliding side to which an eraser is attached, and a sliding cover for one end of the same, substantially as herein shown and described.

2. The combination, with a case, of a reversible slide having an eraser fastened thereto, substantially as herein shown and described.

3. The combination, with a case, of a reversible slide having an eraser fastened thereto, and of a slide provided with an abrading-surface, substantially as herein shown and described.

4. The combination, with a case, of a slide to which an eraser is fastened, a slide having an abrading-surface, and a sliding cover on one end of the case, substantially as herein shown and described.

5. The combination, with a case, of a slide to which an eraser is fastened, a slide having an abrading-surface, a sliding cover on one end of the case, and a spring-pintle for holding the cover in place, substantially as herein shown and described.

6. The combination, with the casing A, having a partition, D, of the slide C, to which the eraser F is fastened, the slide B, having an abrading-surface, the cover G, provided with a recess or cavity, K, in its under surface, and the spring-pintle M in the partition D, substantially as herein shown and described.

LOUIS KROB.

Witnesses:
HENRY C. LILLIBRIDGE,
HENRY W. ADRIAN.